United States Patent Office 3,164,467
Patented Jan. 5, 1965

3,164,467
ULTRAVIOLET SENSITIVE PRINT-OUT COMPOSITIONS AND PROCESS FOR IMAGE-WISE EXPOSURE AND FIXING OF SAME
Robert H. Sprague, Chagrin Falls, and Morris C. Roscow, Cleveland, Ohio, assignors to Horizons Incorporated, a corporation of New Jersey
No Drawing. Filed Mar. 14, 1963, Ser. No. 265,079
11 Claims. (Cl. 96—48)

This invention relates to a new ultraviolet sensitive print-out film. More particularly it relates to improvements over the ultraviolet sensitive print-out film described in United States Patent 3,042,515 and in the Photographic Science and Engineering, volume 5, pages 98–103 (1961).

Although the diphenylamine/carbon tetrabromide material described in the above references yields satisfactory prints in many applications, the bule color has been found to be unsuitable for subsequent printing on color blind film, its low blue absorption resulting in very low contrast prints.

Specifically the present invention is directed particularly to ultraviolet sensitive print-out film in which blue absorbing images e.g. yellow or black images are readily produced.

Photosensitive compositions containing carbon tetrabromide and indoles or pyrroles as the organic amine are disclosed in the United States Patent 3,056,673, issued October 2, 1962, to Eugene Wainer. The ultraviolet sensitive print-out films constituting the present invention are based on specific indoles with or without specific accelerators, possessing improved properties over those disclosed in said patent.

Not all indoles are suitable for the present intended purpose, either because the image obtained does not possess sufficient blue-absorption or for other reasons, noted below.

In obtaining the results tabulated in Table I carbon tetrabromide and either indole or substituted indole or substituted pyrrole were dissolved in a mixture of acetone and ethyl acetate (5:3 by volume). The solution was coated on Mylar 303-D with a Bird applicator and dried at room temperature as described in the article noted above and then through a silver step wedge exposed to 1, 2 or 5 General Electric Sunlamps at 12 inches for between 8 and 12 minutes. After exposure the films were fixed in a forced draft oven at 100° C. for three minutes. Then the optical density was read through the filter indicated with a densitometer.

TABLE I

Coating Conditions and Maximum Densities Obtained

| Coating No. | Coating Components [1] | | | Exposure, G.E. Sunlamps [3] (12 in. distance) | | Density at 21st Step— | | | Color of Image |
|---|---|---|---|---|---|---|---|---|---|
| | Dye Former | Amt., gm. | CBr₄, gm. | No. Lamps | Minutes | Under Blue Filter | Under Green Filter | Under Red Filter | |
| 1 [2] | Diphenylamine | 0.6 | 0.7 | 5GESL | 8 | 0.53 | 1.67 | 2.60 | Blue. |
| 2 | Indole | 0.5 | 0.7 | 5GESL | 8 | 2.10 | 1.15 | 0.30 | Yellow. |
| 3 [2] | ----do---- | 0.5 | 0.7 | 5GESL | 8 | 2.40 | 1.40 | 0.30 | Do. |
| 4 | ----do---- | 0.5 | 1.4 | 5GESL | 8 | 2.27 | 1.28 | 0.26 | Do. |
| 5 | ----do---- | 0.5 | 2.1 | 5GESL | 8 | Did not dry. Density not read. | | | Do. |
| 6 | ----do---- | 0.75 | 1.4 | 5GESL | 8 | 2.70 | 1.45 | 0.28 | Do. |
| 7 | ----do---- | 0.5 | 0.7 | 2GESL | 10 | 2.20 | | | Do. |
| 8 | ----do---- | 0.7 | 0.7 | 2GESL | 10 | 2.45 | | | Do. |
| 9 | ----do---- | 0.9 | 0.7 | 2GESL | 10 | 2.55 | | | Do. |
| 10 | ----do---- | 1.1 | 0.7 | 2GESL | 10 | 2.70 | | | Do. |
| 11 | 2-methylindole | 0.55 | 0.7 | 2GESL | 10 | 1.56 | 1.60 | 0.22 | Orange. |
| 12 | 1,2-dimethylindole | 0.61 | 0.7 | 2GESL | 8½ | 1.10 | 2.00 | | Pink. |
| 13 | 2-phenylindole | 0.80 | 0.7 | 2GESL | 8½ | 0.75 | 1.15 | 0.95 | Blue. |
| 14 | 5-chloro-2-methylindole | 0.60 | 0.7 | 2GESL | 8½ | 1.11 | 0.76 | 0.14 | Yellow. |
| 15 | 3-methylindole or Skatole | 0.55 | 0.7 | 2GESL | 8 | 0.55 | 0.70 | 0.55 | Black. |
| 16 | Skatole | 0.7 | 1.4 | 5GESL | 8 | 0.85 | 0.93 | 0.62 | Do. |
| 17 [2] | 2,5-dimethyl-1-phenylpyrrole | 0.5 | 1.0 | 1GESL | 12 | 1.30 | 0.46 | 0.21 | Yellow. |
| 18 [2] | 2,4-dimethyl-3-ethylpyrrole | 0.09 | 0.7 | 1GESL | 12 | 3+ | 2.66 | 1.27 | Brown-black. |

[1] For each coating the CBr₄ and Dye Former were dissolved in a mixture consisting of 5.0 cc. of acetone and 3.0 cc. of ethyl acetate.
[2] All coatings were 0.0015 wet thickness except Nos. 1, 3, 17 and 18 which were 0.0030 inch wet thickness.
[3] For output of these lamps see U.S. Patent 3,046,209.

Results shown in Table I are illustrative of the effects of varying exposure, concentration or the relative proportions of CBr₄ to various dye formers including indole, substituted indoles or pyrroles. Although 3-methylindole (Skatole) has a very objectionable, extremely rank odor, it gives by far the highest quality black images of any of the indoles. In practice any unreacted skatole would be removed from the film by a solvent rinse or by other suitable treatment. The 2,4-dimethyl-3-ethylpyrrole also gave a black image, although the fog level was very high, due to the oxidation by air during the heat-fixing step, characteristic of certain classes of pyrroles.

Substitution of indole-3-carboxaldehyde for indole in the above indole/carbon tetrabromide formula gave a composition with practically no photographic response when exposed, but when small amounts of the aldehyde were added to the indole composition, a blue-filter density of 2.0 was obtained on one and one-half minute exposure compared with a ten-minute exposure required to reach this density in the unmodified indole formula. The addition of indole-3-carboxaldehyde significantly increases the speed of the indole-carbon tetrabromide compositions.

Substitution of 2-methyl-3-indolealdehyde for indole in the formula gave greatly reduced density on exposure and the addition of 2-methyl-3-indolealdehyde to the indole mixture did not increase the density obtained upon exposure. Image color and background color were similar to the color formed in exposed film without the addition of this compound.

Replacement of indole by 3-acetylindole resulted in considerable loss of speed in the composition although coatings prepared from compositions with both indole and 3-acetylindole were very similar to those of the indole color in image color and background, having approximately the same speed and density.

These results may be summarized as follows.

TABLE II

| Dye former: | Result |
|---|---|
| Indole-3-carboxaldehyde | Not photosensitive. |
| Indole plus indole-3-carboxaldehyde | Much faster than indole alone. |
| 2-methyl-3-indolealdehyde | Greatly reduced density. |
| Indole plus 2-methyl-3-indolealdehyde | No improvement over indole. |
| 3-acetylindole | Considerable loss in speed. |
| Indole plus 3-acetylindole | No improvement over indole. |

The effectiveness of other indole compounds and combinations of indoles were investigated, using a mixture of 5 cc. of methylisobutyl ketone and 3 cc. of isopropyl acetate as the solvent for the carbon tetrabromide, the dye former (diphenylamine or indole compound) and the accelerator when one was used.

The solution so formed was coated with a Bird coater using a wet film thickness of 0.0015 inch on Mylar 302-T. After being dried at room temperature films were exposed to the light of two G.E. Sunlamps at a distance of twelve inches for ten minutes through a Kodak #2 silver step wedge. After exposure the optical density of the area printed at the twenty first or most transparent step of the wedge and optical density of the background were measured with a photo volt densitometer. Results are shown in Table III.

In the tabulated results reported in Table III, numbers 1–17 represent the results obtained when compositions consisting of the indicated weights of $CBr_4$ and the dye former were exposed; numbers 18–34 represent similar compositions except that indole has been added thereto in the amounts indicated; and compositions 35–38 illustrate compositions wherein the constituents are $CBr_4$, a substituted indole and indole-3-carboxaldehyde as the accelerator.

In Table III the specific compounds used were as follows:

| No. | Dye Former |
|---|---|
| 1 | Indole. |
| 2 | Indole-3-carboxylic acid. |
| 3 | Indole-3-butyric acid. |
| 4 | 5-cyanoindole. |
| 5 | 4-chloroindole. |
| 6 | 5-chloroindole. |
| 7 | 5-bromoindole. |
| 8 | 5-bromoindole-3-carboxaldehyde. |
| 9 | 5-chloro-3-methyl indole. |
| 10 | 3-phenylindole. |
| 11 | Indole-3-carbinol. |
| 12 | 5-phenyl-3-methylindole. |
| 13 | Ethyl-3-indole acetate. |
| 14 | 3-dimethylaminomethylindole. |
| 15 | 1-methyl-2-phenylindole. |
| 16 | N-phenylpyrrole. |
| 17 | N-methylpyrrole-2-aldehyde. |

| No. | Dye Former | Accelerator |
|---|---|---|
| 18 | Indole | Indole-3-carboxaldehyde. |
| 19 | do | Indole-3-carboxylic acid. |
| 20 | do | Indole-3-acetic acid. |
| 21 | do | Indole-3-propionic acid. |
| 22 | do | Indole-3-butyric acid. |
| 23 | do | 5-cyanoindo. |
| 24 | do | 5-cyanoindol and Indole-3-carboxaldehyde. |
| 25 | do | 4-chloroindole. |
| 26 | do | 5-chloroindole. |
| 27 | do | 5-bromoindole-3-carboxaldehyde. |
| 28 | do | Indole-3-carbinol. |
| 29 | do | Indole-3-carboxaldehyde and 1-ethyloxindole. |
| 30 | do | Ethyl-3-indole acetate. |
| 31 | do | 3-dimethylaminomethylindole. |
| 32 | do | 1-methyl-2-phenylindole. |
| 33 | do | N-phenylpyrrole. |
| 34 | do | N-methylpyrrole-2-aldehyde. |
| 35 | 5-cyanoindole | Indole-3-carboxaldehyde. |
| 36 | 5-bromoindole | Do. |
| 37 | 5-phenyl-3-methylindole | Do. |
| 38 | 3-dimethylaminomethylindole | Do. |

TABLE III

| No. | Weight in Grams | | Color | | Number of Steps Visible | Blue Filter | |
|---|---|---|---|---|---|---|---|
| | $CBr_4$ | Dye Former | Image | Background | | Density of 21st Step | Density of Base+Fog |
| 1 | 0.9 | 0.5 | Orange | Clear | 13 | 2.05 | 0.03 |
| 2 | 0.9 | 0.5 | Magenta | Magenta | 13 | 1.57 | 0.37 |
| 3 | 0.9 | 0.5 | Gray | Clear | 8 | 0.21 | 0.03 |
| 4 | 0.9 | 0.6 | Light Yellow | do | 7 | 0.51 | 0.03 |
| 5 | 0.9 | 0.64 | Red-Orange | do | 7 | 0.42 | 0.03 |
| 6 | 0.9 | 0.64 | Orange | do | 12 | 1.58 | 0.03 |
| 7 | 0.9 | 0.85 | do | do | 13 | 1.82 | 0.03 |
| 8 | 0.9 | .05 | No image | | | | |
| 9 | 0.9 | 0.62 | Fades to pale tan on heating. | do | 4 | 0.18 | 0.03 |
| 10 | 0.9 | 0.8 | Blue-Black | do | 8 | 0.27 | 0.03 |
| 11 | 0.7 | 0.1 | Magenta | Magenta | 7 | 0.52 | 0.24 |
| 12 | 0.9 | 0.88 | Blue-Black | Clear | 13 | 0.75 | 0.03 |
| 13 | 0.9 | 0.5 | Print, Blue, fades to pale Green-Yellow on heating. | do | 4 | 0.16 | 0.03 |
| 14 | 0.9 | 0.25 | Very faint tan | do | 4 | 0.11 | 0.03 |
| 15 | 0.9 | 0.5 | Blue | do | 13 | 0.52 | 0.03 |
| 16 | 0.9 | 0.62 | Blue to Olive | do | 13 | 0.29 | 0.03 |
| 17 | 0.9 | 0.46 | No Color | | | | |

TABLE III—Continued

| No. | Weight in Grams | | | Color | | Number of Steps Visible | Blue Filter | |
|---|---|---|---|---|---|---|---|---|
| | CBr₄ | Indole | Accelerator | Image | Background | | Density of 21st Step | Density of Base+Fog |
| 18 | 0.9 | 0.5 | 0.04 | Orange | Clear | 17 | 2.23 | 0.03 |
| 19 | 0.9 | 0.5 | 0.1 | ___do___ | Orange | 13 | 2.26 | 0.13 |
| 20 | 0.9 | 0.5 | 0.1 | ___do___ | ___do___ | 13 | 2.20 | 0.08 |
| 21 | 0.9 | 0.5 | 0.1 | ___do___ | Clear | 13 | 2.05 | 0.03 |
| 22 | 0.9 | 0.5 | 0.1 | ___do___ | ___do___ | 13 | 2.08 | 0.03 |
| 23 | 0.9 | 0.5 | 0.1 | ___do___ | ___do___ | 13 | 1.90 | 0.03 |
| 24 | 0.9 | 0.5 | 0.1 0.04 | ___do___ | ___do___ | 16 | 2.10 | 0.03 |
| 25 | 0.9 | 0.5 | 0.06 | ___do___ | ___do___ | 12 | 1.52 | 0.03 |
| 26 | 0.9 | 0.5 | 0.06 | ___do___ | ___do___ | 13 | 1.90 | 0.03 |
| 27 | 0.9 | 0.5 | 0.05 | ___do___ | ___do___ | 17 | 2.28 | 0.05 |
| 28 | 0.7 | 0.5 | 0.1 | ___do___ | Orange | 12 | 2.22 | 0.57 |
| 29 | 0.9 | 0.5 | 0.04 0.04 | ___do___ | Light Orange | 17 | 2.27 | 0.06 |
| 30 | 0.9 | 0.25 | 0.25 | ___do___ | Clear | 13 | 1.90 | 0.03 |
| 31 | 0.9 | 0.5 | 0.1 | ___do___ | Yellow | 5 | 2.01 | 0.08 |
| 32 | 0.9 | 0.25 | 0.25 | Magenta | Clear | 17 | 1.70 | 0.03 |
| 33 | 0.9 | 0.5 | 0.064 | Orange | ___do___ | 15 | 2.06 | 0.03 |
| 34 | 0.9 | 0.5 | 0.046 | ___do___ | ___do___ | 13 | 2.01 | 0.03 |
| 35 | 0.9 | ¹0.6 | 0.04 | Yellow | ___do___ | 9 | 0.80 | 0.03 |
| 36 | 0.9 | ¹0.85 | 0.85 | Orange | ___do___ | 14 | 2.10 | 0.03 |
| 37 | 0.9 | ¹0.88 | 0.04 | Blue-Black | Light Tan | 16 | 1.00 | 0.07 |
| 38 | 0.9 | ¹0.25 | 0.04 | Very faint pink | ___do___ | 6 | 0.29 | 0.06 |

¹ Dye former not indole, see list.

From the foregoing it will be seen that in order to obtain an image with good blue absorption characteristics, in a film having no objectionable background color and possessing good speed and density, the following are required in the composition:

*Activator.*—Carbon tetrabromide or other compound represented by the general formula R—C—Br₃ wherein R represents a member selected from the group consisting of Br, alkyl, bromoalkyl, aroyl, aryl and aralkyl and R is selected so that the compound is normally solid at room temperature. Suitable compounds include carbon tetrabromide, pentabromoethane, hexabromoethane, α,α,α-benzotribromide, p-nitrobenzotribromide and tribromoacetophenone. Mixtures of such compounds may be used in the same manner as the individual compounds.

*Dye former.*—3-methylindole, 5-phenyl-3-methylindole or indole plus one of the following:

Indole-3-carboxaldehyde
5-bromoindole-3-carboxaldehyde
1-methyl-2-phenylindole
N-phenyl pyrrole

*Carrier.*—ethyl acetate, isopropyl acetate, or any film forming plastic compatible with the other constituents may be used when the constituents are to be used in the form of a thin dry self supporting film in which they are dispersed uniformly. Otherwise, the mixture may be applied as a solution to any suitable substrate such as paper or any other inert base and the solvent evaporated therefrom. In the examples above the numbers 303D and 302T refer to a subbed Mylar polyester found to be particularly well suited for the present invention.

*Proportions.*—For each part by weight of indole, 3-methylindole, or 5-phenyl-3-methylindole, between 0.5 and 10.0 parts of CBr₄ or other polybromine organic free radical source and from about 0.001 to 0.5 part by weight of activator when used per part by weight of dye former, about 0.05 to 0.2 part by weight of activator per part of dye former being preferred when the dye former is indole.

Having now described this invention in accordance with the patent statutes it is not intended that it be limited except as required by the appended claims.

1. A composition printing out an image directly when exposed to a suitable dosage of ultraviolet, said image exhibiting relatively good blue absorption, said composition being physically supported in an inert carrier and said composition consisting essentially of (1) at least one organic bromine compound selected from the group consisting of compounds represented by the general formula R—C—Br₃ wherein R is selected from the group consisting of Br, alkyl, aryl, aralkyl, and aroyl such that the compound is normally a solid at room temperature and (2) an indole compound selected from the group consisting of 3-methylindole, 3-methyl-5-phenylindole and mixtures of indole with at least one substituted indole selected from the group consisting of indole-3-carboxaldehyde, 5-bromoindole-3-carboxaldehyde, 1-methyl-2-phenylindole and N-phenyl pyrrole; there being between 0.5 and 10 parts by weight of said organic bromine compound for each part by weight of said indole compound and indole in said composition.

2. The composition of claim 1 uniformly dispersed in a film forming plastic.

3. The composition of claim 1 coated onto a synthetic polymer sheet.

4. A composition printing out an image directly when exposed to a suitable dosage of ultraviolet, said image exhibiting relatively good blue absorption, said composition being physically supported in an inert carrier and said composition consisting essentially of (1) at least one organic bromine compound selected from the group consisting of compounds represented by the general formula R—C—Br₃ wherein R is selected from the group consisting of Br, alkyl, aryl, aralkyl, and aroyl such that the compound is normally a solid at room temperature and (2) 3-methyl-5-phenylindole; there being between 0.5 and 10 parts by weight of said organic bromine compound for each part by weight of 3-methyl-5-phenyl indole in said composition.

5. The composition of claim 4 wherein the bromine compound is a brominated lower alkane selected from the group consisting of methane and ethane.

6. The composition of claim 5 wherein the bromine compound is CBr₄.

7. A composition printing out an image directly when exposed to a suitable dosage of ultraviolet, said images exhibiting relatively good blue absorption, said composition being physically supported in an inert carrier and said composition consisting essentially of (1) at least one organic bromine compound selected from the group consisting of compounds represented by the general formula R—C—Br₃ wherein R is selected from the group consisting of Br, alkyl, aryl, aralkyl, and aroyl such that the compound is normally a solid at room temperature and (2) 3-methylindole; there being between 0.5 and 10 parts by weight of said organic bromine compound for each part by weight of 3-methyl indole in said composition.

8. The composition of claim 7 wherein the bromine compound is a brominated lower alkane selected from the group consisting of methane and ethane.

9. The composition of claim 8 wherein R—C—Br₃ is CBr₄.

10. A composition printing out an image directly when exposed to a suitable dosage of ultraviolet, said image exhibiting relatively good blue absorption, said composition being physically supported in an inert carrier and said composition consisting essentially of (1) at least one organic bromine compound selected from the group consisting of compounds represented by the general formula $$R\text{---}C\text{---}Br_3$$

wherein R is selected from the group consisting of Br, alkyl, aryl, aralkyl, and aroyl such that the compound is normally a solid at room temperature and (2) a mixture of indole and indole-3-carboxaldehyde, there being about 10 parts of indole by weight for each part of indole-3-carboxaldehyde in said mixture and between about 0.5 and 10 parts by weight of said organic bromine compound for each part by weight of indole in said composition.

11. The process which comprises preparing the composition of claim 1 in a thin dry layer, photographically exposing said composition to a dosage of ultraviolet radiation and fixing the resultant image by heat.

References Cited by the Examiner

UNITED STATES PATENTS

| | | | |
|---|---|---|---|
| 1,587,269 | 6/26 | Beebe et al. | 96—115 |
| 3,042,519 | 7/62 | Wainer | 96—90 |
| 3,046,125 | 7/62 | Wainer | 96—90 |
| 3,056,673 | 10/62 | Wainer | 96—90 |
| 3,082,086 | 3/63 | Sprague | 96—90 |

NORMAN G. TORCHIN, *Primary Examiner.*